United States Patent [19]

Schlagel

[11] Patent Number: 4,566,205
[45] Date of Patent: Jan. 28, 1986

[54] GRAIN DRYING AND STORAGE STRUCTURE

[76] Inventor: Lester Schlagel, P.O. Box 8157, Loveland, Colo. 80539

[21] Appl. No.: 574,866

[22] Filed: Jan. 30, 1984

[51] Int. Cl.[4] .......................... E04H 7/24; F26B 19/00
[52] U.S. Cl. ........................................ 34/232; 34/233; 98/56
[58] Field of Search .................. 34/230, 232, 233; 98/52, 54, 55, 56, 57

[56] References Cited

U.S. PATENT DOCUMENTS

| | | | |
|---|---|---|---|
| 501,116 | 7/1893 | Towel | 98/56 |
| 647,301 | 4/1900 | Hollingsworth | 34/232 X |
| 1,660,555 | 2/1928 | Gentslinger | 98/56 |
| 1,761,287 | 6/1930 | Adrian | 98/55 |
| 1,977,389 | 10/1934 | Kramer | 98/55 |
| 2,466,362 | 4/1949 | Blake et al. | 98/56 |
| 2,856,838 | 10/1958 | Mack | 98/55 |
| 3,344,533 | 10/1967 | Peterson | 34/232 X |

Primary Examiner—Harold Joyce
Attorney, Agent, or Firm—Dean P. Edmundson

[57] ABSTRACT

A unique storage structure is described for drying grain as it is stored without movement of the grain and without forcing heated air through the grain. The storage structure includes a vertical tubular stack extending between the floor and the roof. A plurality of perforated tubes in close proximity to each other extend through the grain at an inclined angle and communicate with the vertical stack. Air from outside the structure flows upwardly through the tubes and out through the stack. A fan may be included at the top of the vertical stack to assist in drawing air upwardly through the tubes and the stack.

27 Claims, 9 Drawing Figures

GRAIN DRYING AND STORAGE STRUCTURE

FIELD OF THE INVENTION

This invention relates to grain storage structures. More particularly, this invention relates to drying of grain (i.e., reducing moisture content) in a storage structure without movement of the grain and without energy consumption.

BACKGROUND OF THE INVENTION

When grain (particularly corn) is harvested it has a higher moisture content than desired or necessary for safe storage. The presence of too much moisture will cause the grain to become heated and therefore spoil during storage. Accordingly, harvested grain which contains too much moisture to permit simple bin storage must be dried (i.e., reduced in moisture content) to prevent spoilage.

The most common and accepted techniques for drying grain have involved forcing heated air through the grain to absorb the excess moisture. Normally the air is heated by means of propane or natural gas burners, although it may also be heated electrically. This, of course, requires a very large amount of fuel to heat the volume of air necessary to dry grain in large bins. Furthermore, the heated air must be forced through the grain thoroughly in order to dry the gain in all parts of the bin. This requires the use of one or more large fans of high capacity. Operating such fans also consumes much energy.

A common design for the type of bin utilizing the forced air drying system involves the use of a perforated floor through which the heated air is forced upwardly. Thus, moisture in the grain near the floor must be driven upwardly through grain above it, thereby making the grain wetter as the moisture moves upwardly. This creates a moisture front or bank that must be driven through all of the grain in the bin. This often limits the rate at which the bin may be filled because accumulation of too much moisture will cause spoilage of the grain.

Although various types of bins have been proposed which permit some air ventilation, none of these structures are suitable for storage of high moisture grain (such as shelled corn). For example, U.S. Pat. No. 1,817,270 describes a grain bin including a tubular air conducting stack. Hinged to the stack at each of two separate vertical positions are four arms or auxiliary ventilator members spaced 90° from each other around the stack. This bin structure, however, does not provide for entry of outside air into the bin nor does it provide sufficient ventilation to prevent spoilage of grains with high moisture content. The portable grain storage tank described in U.S. Pat. No. 2,357,705 has essentially the same disadvantages, although it does allow for air to enter the bottom of the stack. A variation of this type of bin structure is described in U.S. Pat. No. 1,977,389, but it does not cure the basic deficiencies described above.

Another type of bin structure is described in U.S. Pat. No. 2,645,991 including a horizontal air duct extending through the bin and a number of vertical ducts extending through the bin and a number of vertical ducts extending upward from the horizontal duct. Fans at the outer ends of the horizontal duct force air into the system. However, there is insufficient air movement in the bin structure to enable high moisture grain to be kept therein without spoilage.

Slightly different apparatus is described in U.S. Pat. No. 2,737,878 including networks of ventilating pipes arranged horizontally at predetermined levels within the storage structure. Compressed air is then forced through the horizontal tubes. In still another variation, described in U.S. Pat. No. 2,126,107, there are intersecting vertical and horizontal tubes within the structure.

Another variation is described in U.S. Pat. No. 3,357,110 in which several (e.g., eight) tubes are vertically disposed within a cylindrical bin. The bin has an inverted cone bottom. A centrally located elevator lifts grain from the bottom of the bin to the top. The grain is then discharged onto a cone-shaped upper floor which enables the grain to slide off in all directions and downwardly within the bin. This structure, of course, requires movement of the grain in the bin.

In U.S. Pat. No. 3,913,469 there is described yet another type of grain bin structure in which a plurality of vertical dividers separate the bin into a plurality of vertically extending grain cells. Each divider is defined by a pair of vertical air permeable side walls to provide a vertical air space between grain cells.

None of the structures previously described provide the advantages and efficiencies provided by the storage structure of the present invention.

SUMMARY OF THE PRESENT INVENTION

In accordance with the present invention there is provided a grain storage structure which is adapted to dry stored grain. The structure comprises:
 (a) a floor portion;
 (b) a roof portion;
 (c) upright wall portions disposed between the floor and roof portions;
 (d) at least one vertical tubular stack extending between the floor and roof portions;
 (e) a plurality of elongated perforated tubes disposed between the stack and the wall portions at an inclined angle of at least about 60°.

The interior ends of the tubes communicate with the stack, and the spacing between adjacent tubes is no greater than about 18 inches. The storage structure is adapted to permit air to pass naturally upwardly through the perforated tubes into the stack and then through the stack and out of the storage structure.

Because the perforated tubes are inclined upwardly between the walls and the stack, air naturally flows from outside the storage structure through the tubes to absorb moisture from the grain and then the air passes into the stack and upwardly out of the storage structure. In one embodiment a small fan may be included in the top of the stack to assist in directing the air out through the top.

The techniques of the invention are applicable to square and rectangular storage bins of all sizes as well as circular bins. Normally there are a plurality of stacks used in the square or rectangular bins. In such event the stacks are aligned in a parallel manner through the center of the structure.

The storage structures of this invention are particularly well suited for the storage and drying of high moisture grain directly after harvesting. For example, corn typically has a moisture content of about 20 to 30% when harvested and cannot be stored in conventional storage structures without having the moisture content reduced to about 13 to 15% in order to prevent spoilage of the grain. With the use of the storage structures of the present invention, grain having high moisture content can be stored safely and effectively. Because of the unique design of the storage structure the grain is dried during storage without undesirable spoilage. Furthermore, the grain is dried in a very economical manner since the techniques of this invention do not require the use of fossil fuels or electricity to heat air or to force such heated air through the grain as is required by conventional techniques.

The techniques of this invention are applicable to storage structures of all sizes. That is, the length, height and diameter of the structure may vary so long as the perforated tubes are adapted to extend through the grain in the manner described herein.

BRIEF DESCRIPTION OF THE DRAWINGS

The invention is described in more detail hereinafter with reference to the accompanying drawings, wherein like reference characters refer to the same parts throughout the several views and in which.

DETAILED DESCRIPTION OF THE INVENTION

Figure 1:
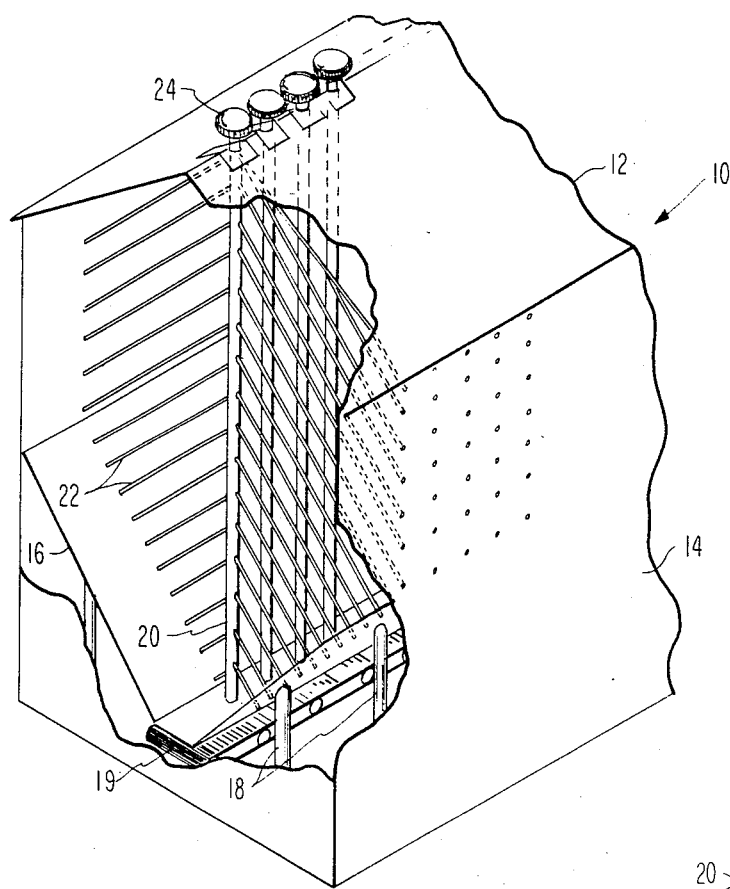
FIG. 1 is a perspective, partial cut-away view of a rectangular storage structure embodying the principles of the present invention.
Figure 2:
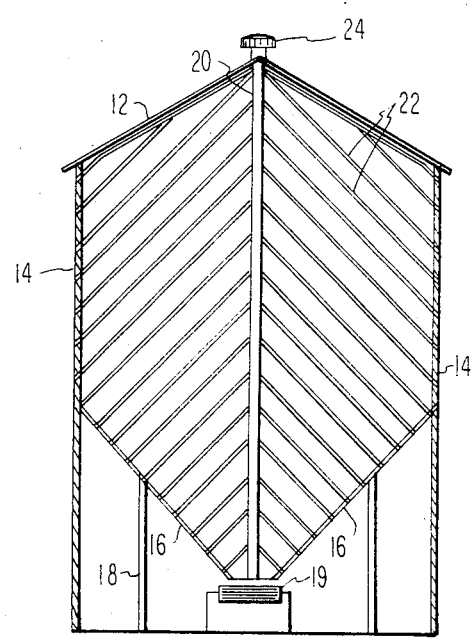
FIG. 2 is an elevational, partial cut-away view of the embodiment of FIG. 1.

Thus, in FIGS. 1 and 2 there is shown a storage structure 10 of the invention having roof 12, upright wall portions 14, and floor portions 16. In this embodiment the floor portions 16 are sloped from wall portions 14 inwardly and downwardly. Frame members 18 support floor portions 16, as shown.

There are a plurality of tubular stacks 20 disposed vertically between the floor and the roof. The stacks 20 are parallel to each other and are normally positioned midway between wall portions 14. The diameter of stacks 20 may vary. When the storage structure has a width in the range of about 14 to 16 feet the diameter of each stack 20 is normally in the range of about six to about eight inches. Larger stacks may be used if desired. Each stack is hollow and typically has a uniform diameter along its length.

A plurality of elongated perforated tubes 22 are disposed between each stack 20 and wall portions 14 at an inclined angle, as shown. Tubes 22 thus extend through the grain stored in structure 10. The interior ends of tubes 22 communicate with stack 20. The outer ends of tubes 22 in this embodiment extend to wall portions 14 and are capable of receiving air from the outside of structure 10 through appropriately positioned openings in the wall portions. Tubes 22 thus carry air from outside structure 10 through the grain to absorb moisture and then the moisture-laden air proceeds into stack 20 where it proceeds upwardly and out of the storage structure. Because the floor is sloped in the embodiment shown in FIGS. 1 and 2 some of the tubes 22 receive outside air through the sloped floor 16, as shown.

Tubes 22 may be metal or plastic cylindrical pipes, for example, which have a plurality of small openings or apertures therein which are smaller than the kernels of grain stored in the structure. The apertures enable air to pass therethrough. The diameter of tubes 22 may vary, e.g., 0.75–2 inches. A preferred diameter, however, is in the range of about 0.75 to about 1 inch. The cross-sectional configuration of tube 22 may vary, e.g., it may be circular, oval, square, triangular, etc. so long as it has a bore therethrough which permits air to pass through it from one end to the other.

Preferably tubes 22 are parallel to each other and are spaced no more than about 18 inches apart. More preferably they are spaced no more than about 16 inches apart. If it is desired to store grain in the structure which has a very high moisture content (e.g., 30%), it is preferred that tubes 22 be spaced about 12 inches apart so that the total air carrying capacity of the tube system is increased even further.

The tubes are inclined from the walls to the central stack so that air flows upwardly through the tubes to the stack. The tubes are inclined at an angle of 60° or greater (e.g., 70°) to facilitate upward movement of the air.

Moist grain in the structure has a tendency to become warm and as it does this the air tends to flow naturally upwardly through the tubes 22 and stack 20. The greater the degree of warming of the grain the greater the amount of air flow through the structure. The grain is cooled and dried by this air flow. Accordingly, grain spoilage is avoided.

High moisture grain (e.g., shelled corn) can be kept in good condition so long as the temperature of the grain is kept below about 60° F. The storage structures of this invention are capable of maintaining the moist grain below an unsafe temperature by circulation of outside air through the grain as described herein. Of course, as with prior techniques, the grain is screened before being placed in the storage structure in order to remove dirt, trash, etc.

At the top of each stack 20 is a conventional rotatable vent cap 24. The cap prevents rain, etc. from entering stack 20.

In a preferred embodiment, a small fan may be included near the top of each stack. The fan may be electrically powered or it may be operably connected to the rotatable vent cap 24 in such a manner that wind will power the fan. The purpose of a fan is to assist in directing and drawing moist air upwardly through the stack and out of the storage structure. This will tend to increase the rate of air flow through tubes 22 when the grain contains a high amount of moisture, for example.

In a more preferred embodiment temperature sensors may be operably connected to each fan in such a manner that they will activate the fan associated with each particular stack in any area where the grain has become heated to an undesirable temperature (e.g., 70° F.). In this manner only the fans at the top of those stacks near the heated grain are activated to increase the air flow in the area where it is needed.

The size of the fans is typically small (e.g., six inches) and they may be each powered with a small electric motor (e.g., less than 0.25 horsepower).

The storage structure may be emptied, for example, by means of conveyer 19 extending the length of the structure. A plurality of removable plates in the lowermost portion of the storage structure may be removed as needed in order to enable the stored grain to flow onto the conveyer.

The rectangular storage structures are normally about 14 to 16 feet in width and up to about 60 feet long in order to permit transport of the structures along roads and highways. Several of the structures may be positioned in end-to-end fashion, if desired, at the intended storage site.

Figure 6:
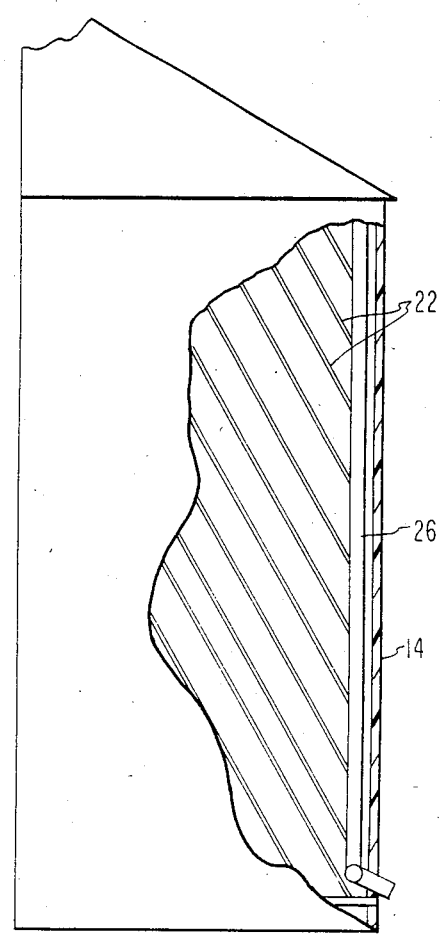
FIG. 6 illustrates another embodiment of the present invention.

In FIG. 6 there is illustrated an alternative embodiment in which the outer ends of perforated tubes 22 do not extend through the wall. In this embodiment the outer ends of tubes 22 communicate with a vertical conduit 26 adjacent to the wall 14. Conduit 26 is adapted to permit outside air to enter (normally through an opening in wall 14), and the air is then able to pass into each of the tubes 22. The advantage of this embodiment is that it is not necessary to provide an opening in wall 14 for each tube 22. Rather, since the outer ends of tubes 22 communicate with vertical conduit 26, it is only necessary to provide an opening to conduit 26 from the outside. This reduces the number of openings required in wall 14 and accordingly facilitates installation of the system in existing storage structures (which may be of the rectangular type, the circular type, or any other configuration). Furthermore, the integrity of the wall 14 is less affected by this embodiment. Such a conduit 26 is associated with each set of tubes 22, of course.

Vertical conduits 26 may be of various sizes and cross-sectional shapes. For example, they may be cylindrical or they may be rectangular, oval, etc. in cross-section. The diameter may also vary. Typically a diameter in the range of about 2 to about 4 inches is adequate for most common size storage structures.

In another embodiment of the invention the outer ends of tubes 22 may be provided with caps or covers so that air passage into the tubes may be discontinued when the grain in the storage structure has been dried to the desired extent. For example, shelled corn need not be dried below about 13% moisture content. In the embodiment shown in FIG. 6, the cap or cover may instead be provided at the outside opening to each conduit 26.

Figure 7:
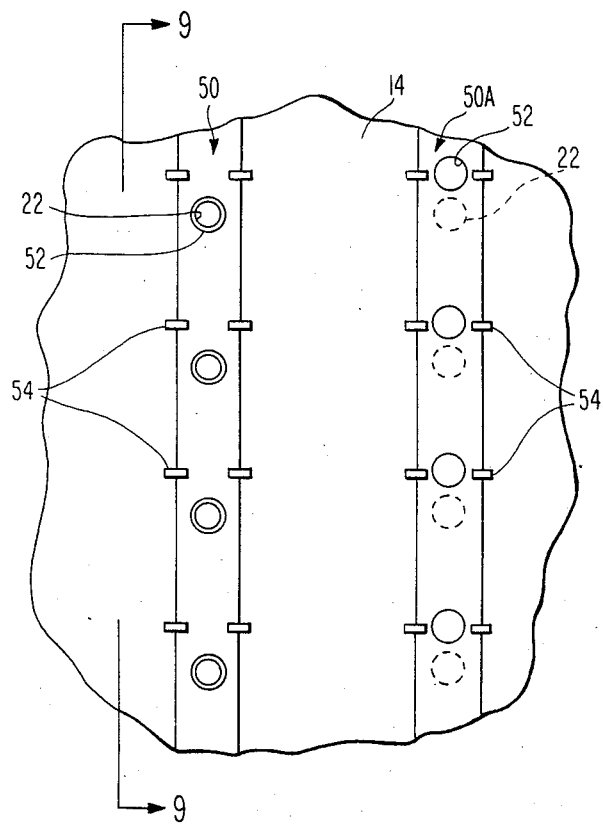
FIG. 7 is an elevational view of a portion of the storage structure of FIG. 1 further including closure means.
Figure 9:
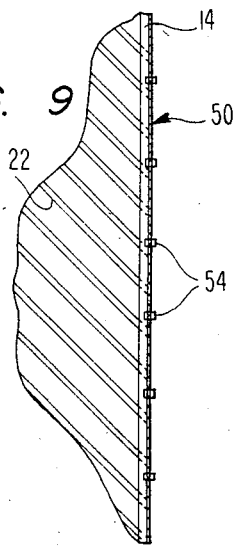
FIG. 9 is a cross-sectional view of the embodiment of FIG. 7 taken along line 9—9.

In FIGS. 7 and 9 there is illustrated one type of closure means 50 which is in the form of an elongated strip having a plurality of spaced apertures 52 therealong which register with the ends of the perforated tubes 22 extending through the wall 14 of the structure. The strip may be held against the wall 14 by means of clips 54. When the apertures 52 register with the ends of tubes 22 air may pass through the tubes. When the strip is moved vertically (illustrated in FIG. 7 as 50A), air is prevented from entering the tubes 22.

Figure 8:
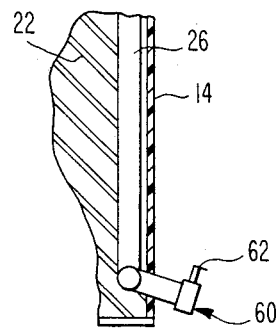
FIG. 8 illustrates another type of closure means which is useful in connection with the embodiment of storage structure shown in FIG. 6.

In FIG. 8 there is illustrated a closure means which is useful in connection with the type of storage structure shown in FIG. 6. Adapter 60 is fastened to the end of the outlet on vertical conduit 26. A sliding door 62 may be moved downwardly to close off the opening into conduit 26 when it is desired to stop further air flow into conduit 26.

Figure 5:
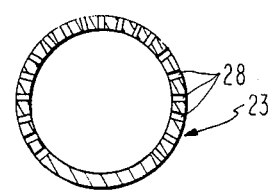
FIG. 5 is a cross-sectional view of one embodiment of perforated tube which is useful in the present invention.

In FIG. 5 there is shown a cross-sectional view of another embodiment of perforated tube 23 which is useful in the present invention. In this embodiment the perforations or apertures 28 through tube 23 are not present on the underside of the tube. Accordingly, when moisture condenses inside tube 23 the water will run down the tube (because of the solid underside) and exit the storage structure through the wall where the tube communicates with the outside. This prevents the condensed moisture from draining into the grain.

Figure 3:
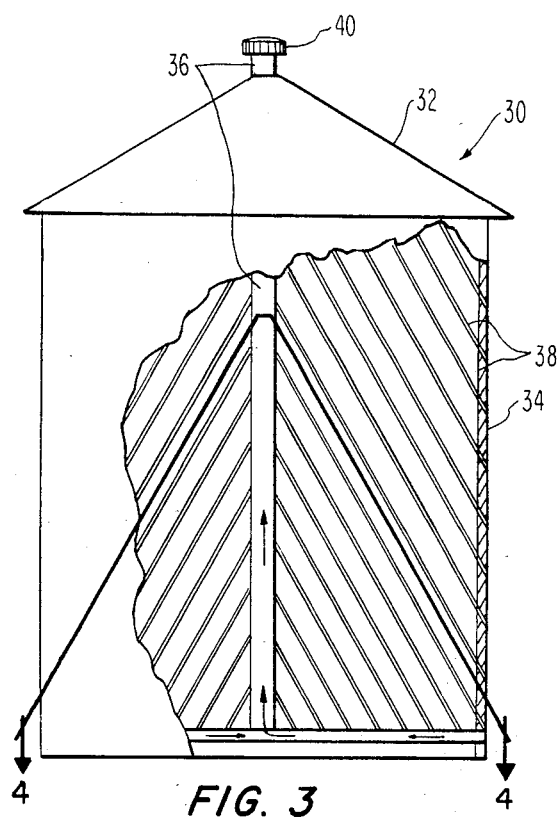
FIG. 3 is an elevational, partial cut-away view of a circular storage structure of the invention.
Figure 4:
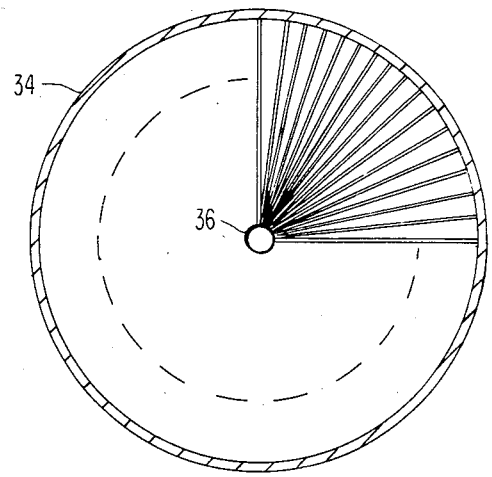
FIG. 4 is a top view showing the arrangement of the tubes and stack in the embodiment of FIG. 3.

In FIGS. 3 and 4 there is shown another embodiment of storage structure 30 of the invention having roof 32 and wall 34. There is a central vertical tubular stack 36 disposed between the roof and the floor. A plurality of inclined tubes 38 extend between the wall 34 and stack 36. Tubes 38 are inclined at an angle of at least 60° or more. The spacing between tubes 38 is similar to that described above in connection with the embodiment of FIG. 1. Air enters the storage structure through the ends of tubes 28. Air may also enter the structure through the floor, as shown by the arrows.

Central stack 36 is generally cylindrical and normally has a diameter of about 30 inches when the diameter of the storage structure is about 50 feet. The top of the stack may be provided with a rotatable vent cap 40. Near the top (normally powered by an electric motor which is less than about 2 horsepower). If desired, temperature sensors may be operatively associated with the fan so that it is activated when grain in any area becomes too warm.

In another embodiment the fan may be adapted to be driven by the force of the wind acting upon rotatable vent cap 40. The embodiment of FIG. 6 may also be utilized in order to reduce the number of required openings in wall 34. This is important, for example, when adapting the techniques of the present invention to existing structures.

The storage structures of this type may be emptied by means of conventional augers, etc., if desired. They may be filled through appropriate openings in the roof of the structures.

Other variants are possible without departing from the scope of the present invention.

What is claimed is:

1. A grain storage structure which is adapted to dry grain stored therein, said storage structure comprising:
    (a) a floor portion;
    (b) a roof portion;
    (c) upright wall portions disposed between said floor and roof portions; wherein said wall portions have a plurality of openings therein;
    (d) at least one vertical tubular stack extending between said floor and said roof portions and further having an open end which extends through said roof portions;
    (e) a plurality of elongated perforated tubes disposed between said stack and said wall portions; said tubes having interior ends and exterior ends, wherein said tubes extend upwardly from said exterior ends to said interior ends at an inclined angle of at least about 60°, wherein the interior ends of said tubes communicate with said stack and the exterior ends communicate with said openings in said wall portions; wherein said tubes are perforated except on the underside thereof in a manner such that said tubes are adapted to direct condensed moisture through said openings in said wall portions; and wherein the spacing between adjacent tubes is not greater than about 18 inches;

and wherein said storage structure is adapted to permit air to pass upwardly through said perforated tubes into said stack and then through said stack and out of said structure.

2. A grain storage structure in accordance with claim 1, wherein said tubular stack is cylindrical and has a diameter greater than that of said tubes.

3. A grain storage structure in accordance with claim 1, wherein said tubular stack has a diameter in the range of about six to eight inches.

4. A grain storage structure in accordance with claim 1, wherein said tubes comprise cylindrical metal pipes.

5. A grain storage structure in accordance with claim 1, wherein said tubes comprise cylindrical plastic pipes.

6. A grain storage structure in accordance with claim 1, wherein said tubes have a diameter in the range of about 0.75 to 2 inches.

7. A grain storage structure in accordance with claim 1, wherein said tubes are inclined at an angle of at least 70°.

8. A grain storage structure in accordance with claim 1, further comprising a fan disposed at the top of said stack which is adapted to draw air through said stack.

9. A grain storage structure in accordance with claim 8, further comprising heat sensing means adapted to activate said fan when grain stored in said structure exceeds a predetermined temperature.

10. A grain storage structure in accordance with claim 1, further comprising closure means adapted to prevent movement of air through said tubes when the moisture content of grain stored in said structure falls below a predetermined value.

11. A grain storage structure which is adapted to dry grain stored therein, said storage structure having a circular cross-section and comprising:
(a) a floor portion;
(b) a roof portion;
(c) a circular upright wall portion disposed between said floor and roof portions; wherein said wall portion has a plurality of openings therein;
(d) a centrally located vertical tubular stack extending between said floor and said roof portion and further having an open end which extends through said roof portions;
(e) a plurality of elongated perforated tubes disposed between said stack and said wall portion; said tubes having interior ends and exterior ends, wherein said tubes extend upwardly from said exterior ends to said interior ends at an inclined angle of at least about 60°, wherein the interior ends of said tubes communicate with said stack and the exterior ends communicate with said openings in said wall portion; wherein said tubes are perforated except on the underside thereof in a manner such that said tubes are adapted to direct condensed moisture through said opeings in said wall portion; and wherein the spacing between adjacent tubes is no greater than about 18 inches;

and wherein said storage structure is adapted to permit air to pass upwardly through said perforated tubes into said stack and then through said stack and out of said structure.

12. A grain storage structure in accordance with claim 11, wherein said tubular stack is cylindrical and has a diameter greater than that of said tubes.

13. A grain storage structure in accordance with claim 11, wherein said tubular stack has a diameter of about 30 inches.

14. A grain storage structure in accordance with claim 11, wherein said tubes comprise cylindrical metal pipes.

15. A grain storage structure in accordance with claim 11, wherein said tubes comprise cylindrical plastic pipes.

16. A grain storage structure in accordance with claim 11, wherein said tubes have a diameter in the range of about 0.75 to 2 inches.

17. A grain storage structure in accordance with claim 11, wherein said tubes are inclined at an angle of at least 70°.

18. A grain storage structure in accordance with claim 11, further comprising a fan disposed at the top of said stack which is adapted to draw air through said stack.

19. A grain storage structure in accordance with claim 18, further comprising heat sensing means adapted to activate said fan when grain stored in said structure exceeds a predetermined temperature.

20. A grain structure which is adapted to dry grain stored therein, said storage structure comprising:
(a) a floor portion;
(b) a roof portion;
(c) an upright wall disposed between said floor and roof portions;
(d) at least one vertical tubular stack extending between said floor and said roof portions and further having an open end which extends through said roof portions;
(e) at least one vertical conduit adjacent to an interior surface of said wall, wherein said conduit communicates with an opening in the lower portion of said wall;
(f) a plurality of elongated perforated tubes disposed between said stack and said wall portions; said tubes having interior ends and exterior ends, wherein said tubes extend upwardly from said exterior ends to said interior ends at an inclined angle of at least about 60°, wherein the interior ends of said tubes communicate with said stack and the exterior ends communicate with said vertical conduit; wherein said tubes are perforated except on the underside thereof in a manner such that said tubes are adapted to direct condensed moisture into said vertical conduit, and wherein said conduit is adapted to direct said condensed moisture through said opening in said lower portion of said wall; wherein the spacing between adjacent tubes is no greater than about 18 inches;

and wherein said conduit is adapted to permit air to enter said storage structure and pass upwardly through said tubes into said stack and then through said stack and out of said structure.

21. A storage structure in accordance with claim 20, wherein said tubular stack is cylindrical and has a diameter greater than that of said tubes.

22. A storage structure in accordance with claim 20, wherein said tubes are inclined at an angle of at least 70°.

23. A storage structure in accordance with claim 20, wherein said structure is rectangular.

24. A storage structure in accordance with claim 20, wherein said structure is circular.

25. A storage structure in accordance with claim 20, further comprising a fan disposed at the top of said stack which is adapted to draw air through said stack.

26. A storage structure in accordance with claim 25, further comprising heat sensing means adapted to activate said fan when grain stored in said structure exceeds a predetermined temperature.

27. A storage structure in accordance with claim 20, further comprising closure means adapted to prevent movement of air through said tubes.

* * * * *